United States Patent
Parker et al.

(10) Patent No.: US 7,900,073 B2
(45) Date of Patent: Mar. 1, 2011

(54) APPARATUS FOR STORING MANAGEMENT INFORMATION IN A COMPUTER SYSTEM

(75) Inventors: Joseph R. Parker, Hillsborough, NC (US); Paul Plaskonos, Raleigh, NC (US)

(73) Assignee: Lenovo (Singapore) Pte. Ltd., Singapore (SG)

(*) Notice: Subject to any disclaimer, the term of this patent is extended or adjusted under 35 U.S.C. 154(b) by 547 days.

(21) Appl. No.: 12/057,935

(22) Filed: Mar. 28, 2008

(65) Prior Publication Data

US 2009/0248956 A1  Oct. 1, 2009

(51) Int. Cl.
*G06F 1/32* (2006.01)

(52) U.S. Cl. .............. 713/323; 713/1; 710/36; 711/115; 711/149

(58) Field of Classification Search .......... 713/1, 713/2, 323; 710/36; 711/115, 149
See application file for complete search history.

(56) References Cited

U.S. PATENT DOCUMENTS 6,920,553 B1 * 7/2005 Poisner .................... 713/2
2007/0033426 A1 * 2/2007 Wilson et al. ............. 713/324
2008/0288711 A1 * 11/2008 Jung et al. ................ 711/102

* cited by examiner

*Primary Examiner*—Thuan N Du
(74) *Attorney, Agent, or Firm*—Antony P. Ng; Dillon & Yudell LLP

(57) ABSTRACT

An apparatus for providing management storage via a USB port of a computer system is disclosed. The apparatus includes a flash memory, a first and second switches, a first and second inverters, a designated port, and a controller. Coupled to the flash memory, the first and second switches are controlled by a main power of a computer system in a complementary manner. The first and second inverters, which are powered by a standby power of the computer system, are coupled to a respective control input of the first and second switches. The designated port, which is coupled to the flash memory via the first switch, allows data to be read from and written to the flash memory without booting up the computer system. On the other hand, the controller, which is coupled to the flash memory via the second switch, allows data to be read from and written to the flash memory by the computer system only after the computer system has been booted up.

18 Claims, 2 Drawing Sheets

APPARATUS FOR STORING MANAGEMENT INFORMATION IN A COMPUTER SYSTEM

BACKGROUND OF THE INVENTION

1. Technical Field

The present invention relates to computers in general, and in particular to computers having a universal serial bus (USB) port. Still more particularly, the present invention relates to an apparatus for providing management storage via a USB port of a computer system.

2. Description of Related Art

In a large company, there is often a need to store information to computer systems for management purposes. Such information may include lease details, employee ownership, physical location, etc. of the computer system.

In the past, computer systems were equipped with a radio-frequency identification device (RFID) chip along with an additional storage device to allow the above-mentioned management information to be stored within the computer systems. The management information can be read with a radio-frequency scanner without the necessity of booting up each computer system. However, the usage of RFID chip in computer systems for storing management information was not broadly adopted because of its cumbersomeness.

SUMMARY OF THE INVENTION

In accordance with a preferred embodiment of the present invention, an apparatus for storing management information in a computer system includes a flash memory, a first and second switches, a first and second inverters, a designated port, and a controller. Coupled to the flash memory, the first and second switches are controlled by a main power of a computer system in a complementary manner. The first and second inverters, which are powered by a standby power of the computer system, are coupled to a respective control input of the first and second switches. The designated port, which is coupled to the flash memory via the first switch, allows data to be read from and written to the flash memory without booting up the computer system. On the other hand, the controller, which is coupled to the flash memory via the second switch, allows data to be read from and written to the flash memory by the computer system only after the computer system has been booted up.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
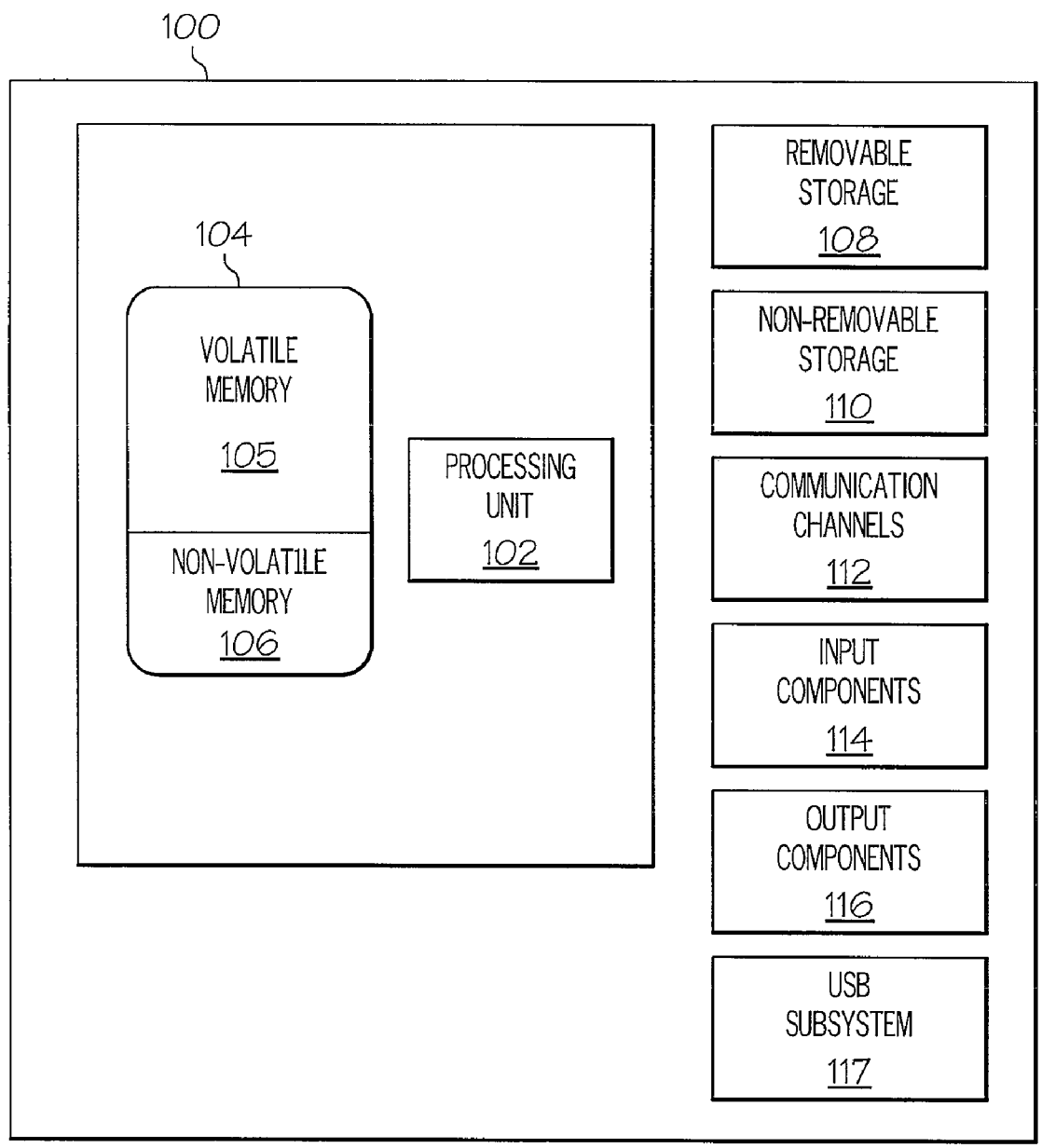
FIG. 1 is a block diagram of a computer system in which a preferred embodiment of the present invention is incorporated.

Referring now to the drawings and in particular to FIG. 1, there is depicted a block diagram of a computer system in which a preferred embodiment of the present invention is incorporated. As shown, a computer system 100 includes a processing unit 102 and a memory 104. Memory 104 includes a volatile memory 105 (such as a random access memory) and a non-volatile memory 106 (such as a read-only memory). Computer system 100 also contains removable storage media devices 108, such as compact discs, optical disks, magnetic tapes, etc., and non-removable storage devices 110, such as hard drives. Computer system 100 also includes input components 114 such as a keyboard, mouse, etc., and output components 116 such as displays, speakers, printers, etc. Computer system 100 may contain communication channels 112 for providing communications with other computer systems via a computer network.

In addition, computer system 100 includes a universal serial bus (USB) subsystem 117 for providing multiple USB ports to serve as input/output ports. In accordance with a preferred embodiment of the present invention, one of the USB ports within USB subsystem 117 is designated to provide and receive management information without booting up computer system 100. The designated USB port is connected to an internal USB flash memory. The internal USB flash memory provides non-volatile storage of the management information that can be accessed via the designated USB port without booting up computer system 100. In addition, a standard USB cable can be utilized to connect the designated USB port to another computer system for writing or reading management information to or from the internal USB flash memory.

Figure 2:
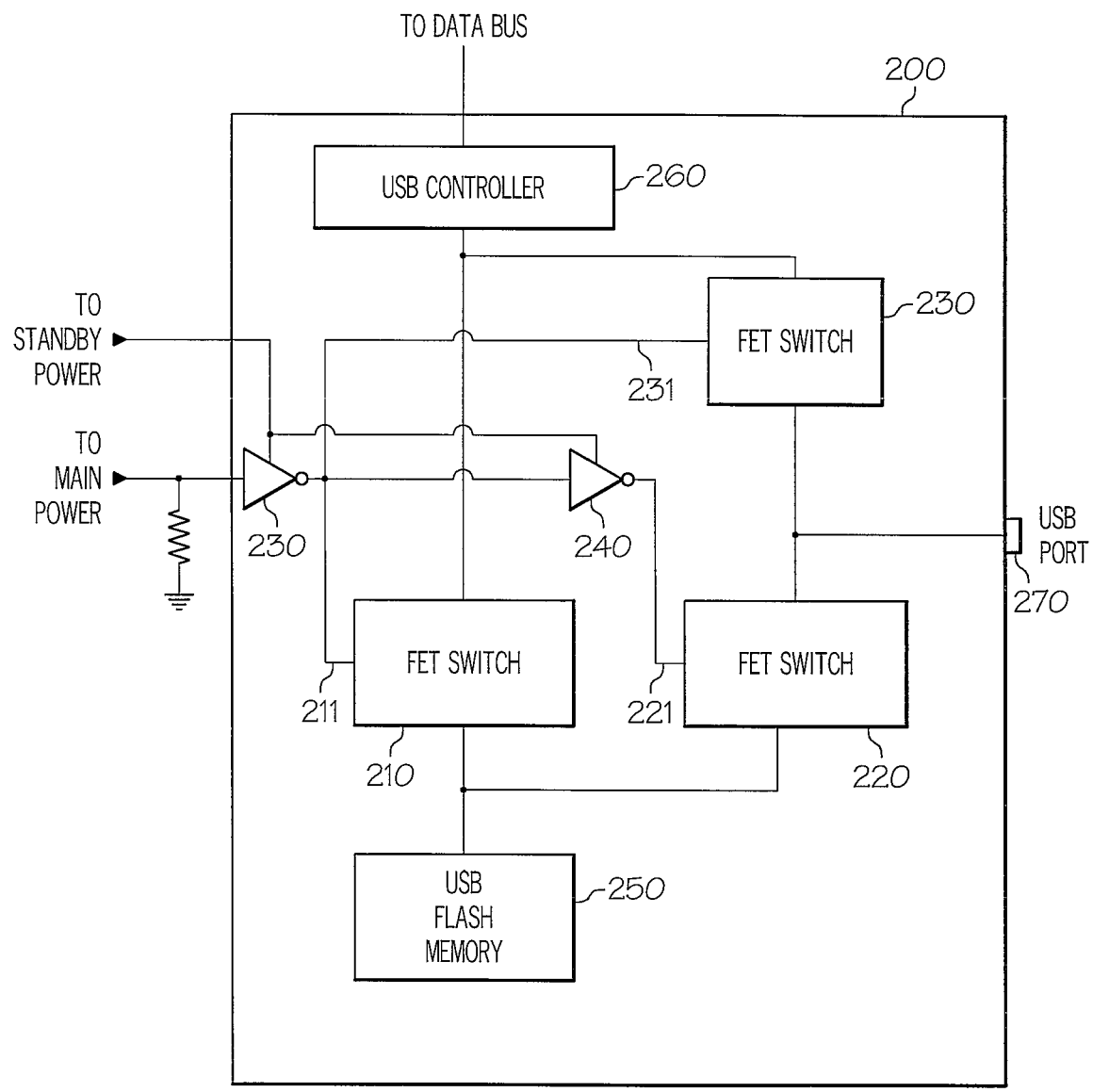
FIG. 2 is a block diagram of an apparatus for storing management information within the computer system of FIG. 1, in accordance with a preferred embodiment of the present invention.

With reference now to FIG. 2, there is illustrated a block diagram of an apparatus for storing management information in computer system 100 of FIG. 1, in accordance with a preferred embodiment of the present invention. As shown, an apparatus 200, which is located within USB subsystem 117 from FIG. 1, includes a USB controller 260, inverters 230 and 240, a USB flash memory 250 connected to field-effect transistor (FET) switches 210 and 220, and a designated USB port 270 connected to a FET switch 230. For the present embodiment, inverter 230 is preferably an inverter with hysterysis.

A control input 211 of FET switch 210 and a control input 231 of FET switch 230 are connected to a main power of computer system 100 via inverter 230. A control input 221 of FET switch 210 is connected to a main power of computer system 100 via inverter 240. Inverters 230 and 240 are powered by a standby power of computer system 100. For the present disclosure, standby power is defined as the level of power received by computer system 100 when computer system 100 is turned off (or not boot up). On the other hand, main power is defined as the level of power received by computer system 100 when computer system 100 is turned on (or boot up). Thus, standby power is lower than main power.

When computer system 100 is turned off, FET switch 220 is turned on by main power to allow designated USB port 270 to be connected to USB flash memory 250, while FET switch 210 is turned off. Thus, management information can be sent from a host computer (not shown) to USB flash memory 250 via a standard USB cable connected between USB port 270 and a USB port of the host computer. Similarly, management information can also be sent from USB flash memory 250 to the host computer. During data transfer, power for designated USB port 270 and USB flash memory 250 are supplied by the USB port of the host computer. As a result, management information can be loaded into or extracted from USB flash memory 250 without booting up computer system 100.

When computer system 100 is turned on, FET switches 210, 230 are both turned on by main power to allow USB controller 260 to be connected to USB flash memory 250 and USB port 270, while FET switch 220 is turned off. At this point, USB port 270 operates as a standard USB port. In addition, after the management information have been populated within USB flash memory 250, the management information can be made available to systems management functions within computer system 100 once computer system 100 has been booted up.

During normal operation of computer system 100, critical log information can also be stored to USB flash memory 250. For example, when there is a malfunction occurred within computer system 100, the log information can be stored in USB flash memory 250, which are readily available to a service technician in the future.

As has been described, the present invention provides an improved apparatus for storing management information in computer systems within a large company.

While the invention has been particularly shown and described with reference to a preferred embodiment, it will be understood by those skilled in the art that various changes in form and detail may be made therein without departing from the spirit and scope of the invention.

What is claimed is:

1. An apparatus comprising:
   a flash memory;
   a first and second switches coupled to said flash memory, wherein said first and second switches are controlled by a first power of a computer system in a complementary manner;
   a first circuitry and second circuitry coupled to a respective control input of said first and second switches, wherein said first circuitry and second circuitry are powered by a second power of said computer system;
   a designated port, coupled to said flash memory via said first switch, for allowing data to be read from and written to said flash memory without booting up said computer system; and
   a controller, coupled to said flash memory via said second switch, for allowing data to be read from and written to said flash memory by said computer system only after said computer system has been booted up.

2. The apparatus of claim 1, wherein said flash memory is an universal serial bus (USB) flash memory.

3. The apparatus of claim 2, wherein said designated port is an USB port.

4. The apparatus of claim 3, wherein said controller is an USB controller.

5. The apparatus of claim 1, wherein said first and second switches are field effect transistor (FET) switches.

6. The apparatus of claim 1, wherein said first power is a main power and said second power is a standby power.

7. The apparatus of claim 1, wherein said apparatus further includes a third switch coupled between said controller and said designated port, wherein said third switch allows data to be read from and written to said designated port by said controller after said computer system has been booted up.

8. The apparatus of claim 7, wherein said third switch is controlled by said first power in the same manner as said second switch.

9. The apparatus of claim 7, wherein said third switch is a FET switch.

10. The apparatus of claim 1, wherein said flash memory is capable of storing log information after a malfunction has occurred within said computer system.

11. A method comprising:
    coupling a first and second switches to a flash memory, wherein said first and second switches are controlled by a first power of a computer system in a complementary manner;
    coupling a first circuitry and second circuitry to a respective control input of said first and second switches, wherein said first circuitry and second circuitry are powered by a second power of said computer system;
    allowing data to be read from and written to said flash memory via a designated port without booting up said computer system, wherein said designated port is coupled to said flash memory via said first switch; and
    allowing data to be read from and written to said flash memory via a controller of said computer system only after said computer system has been booted up, wherein said controller is coupled to said flash memory via said second switch.

12. The method of claim 11, wherein said flash memory is an USB flash memory, wherein said designated port is an USB port, wherein said controller is an USB controller.

13. The method of claim 11, wherein said first and second switches are FET switches.

14. The method of claim 11, wherein said first power is a main power and said second power is a standby power.

15. The method of claim 11, wherein said method further includes coupling a third switch between said controller and said designated port.

16. The method of claim 15, wherein said third switch is controlled by said first power in the same manner as said second switch.

17. The method of claim 15, wherein said third switch is a FET switch.

18. A method comprising:
    providing a designated port in a computer system, wherein said designated port being capable of being conditionally alternatively coupled between an internal flash memory seen from said designated port as a slave device and a port controller seen from said designated port as a master device;
    in response to said computer system being booted up, coupling said designated port to said port controller such that said port controller is seen from said designated port as a master device; and
    in response to said computer system not booted up, coupling said designated port to said internal flash memory such that said internal flash memory is seen from said designated port as a slave device.

* * * * *